Sept. 27, 1960 E. A. DAHL, SR 2,954,032

CARD FILE TRAY

Filed Feb. 2, 1953 2 Sheets-Sheet 1

INVENTOR.

Ernest A. Dahl, Sr.

By: Moore, Olson & Trexler attys.

Sept. 27, 1960 E. A. DAHL, SR 2,954,032

CARD FILE TRAY

Filed Feb. 2, 1953 2 Sheets-Sheet 2

INVENTOR.

Ernest A. Dahl Sr.

By: Moore, Olson & Trexler attys.

2,954,032

CARD FILE TRAY

Ernest A. Dahl, Sr., 7916 Lincoln Ave., Skokie, Ill.

Filed Feb. 2, 1953, Ser. No. 334,496
3 Claims. (Cl. 129—16)

This invention is concerned with a magnetic card file.

One of the major faults with card files in general is that the subject matter on the cards cannot be told at a glance when they are in their normal positions in their file. It is necessary to thumb through the cards even for such a simple matter as reading the top line of each card to ascertain the subject matter. This is time consuming and leads to short card life. Magnetic card files have been devised to overcome this difficulty. In these files cards are provided incorporating magnetically susceptible inserts, and when these cards are filed in position to be exposed to a proper magnetic field, like magnetic charges are developed in corresponding parts of the inserts of adjacent cards. The like charges exert repulsive forces on one another and the cards tend to fan out to render their subject matter clearly visible.

Certain drawbacks have been present in prior magnetic card files. Closely adjacent magnets of adjacent files have caused partial cancellation of magnetic fields and consequent weakness in operation; deterioration or weakening of magnets has been brought about by too close positioning to steel supporting structure; magnetic structures generally have been bulky and awkward; separators between groups of cards have restricted proper fanning out of cards; and friction of cards against the side of a file, particularly when the cards are off center so that the magnet on one side exerts a greater attractive force than that on the other, likewise has militated against proper fanning out of cards.

Accordingly, it is an object of this invention to provide a magnetic file obviating the above noted defects.

Another object of this invention is to provide, in a magnetic card file, means affording an air space extending outwardly alongside each magnet to isolate the magnets.

A further object of this invention is to provide, in a magnetic card file, handles for lifting the file and affording isolating air spaces adjacent each magnet.

A further object of this invention is to provide, in a magnetic card file, a flat, bar magnet occupying a minimum of space, and means providing an air space adjacent each magnet for magnetic isolation.

Yet another object of this invention is to provide a magnetic card file having separators mounted to lean farther forward than backwards to facilitate proper fanning out of cards.

A further object of this invention is to provide card centering means engaging the cards only over small areas near the bottoms thereof to reduce friction to fanning out to a minimum.

Other objects and advantages of the present invention will be apparent from the following description when taken in connection with the accompanying drawings wherein.

Figures 1, 2, 3:
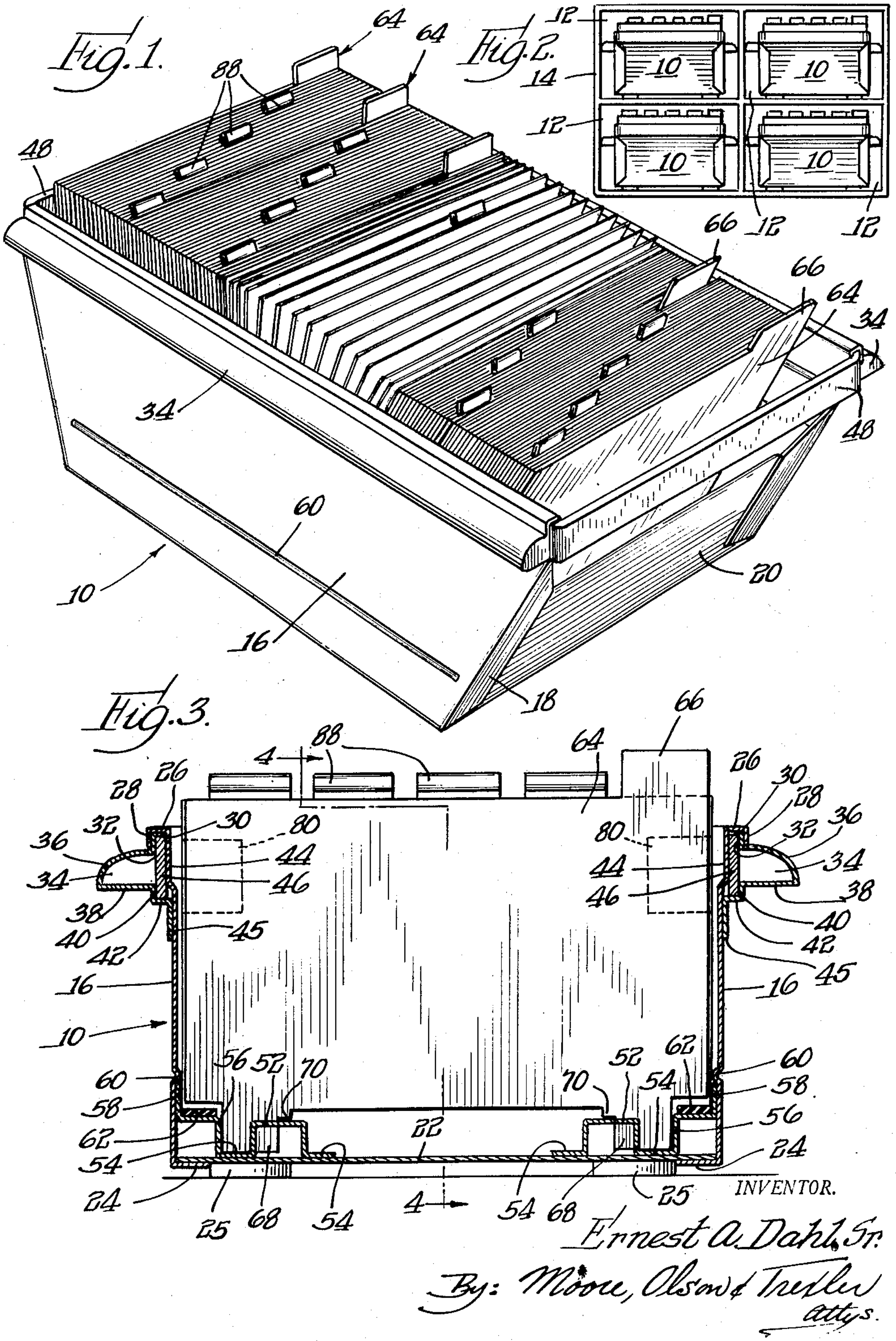
Fig. 1 is a perspective view of a file constructed in accordance with the principles of my invention.
Fig. 2 is an end view of a plurality of my files placed as drawers in a cabinet.
Fig. 3 is a cross-sectional view through the file substantially along the line 3—3 of Fig. 4.
Figures 4, 5, 6, 7, 8:
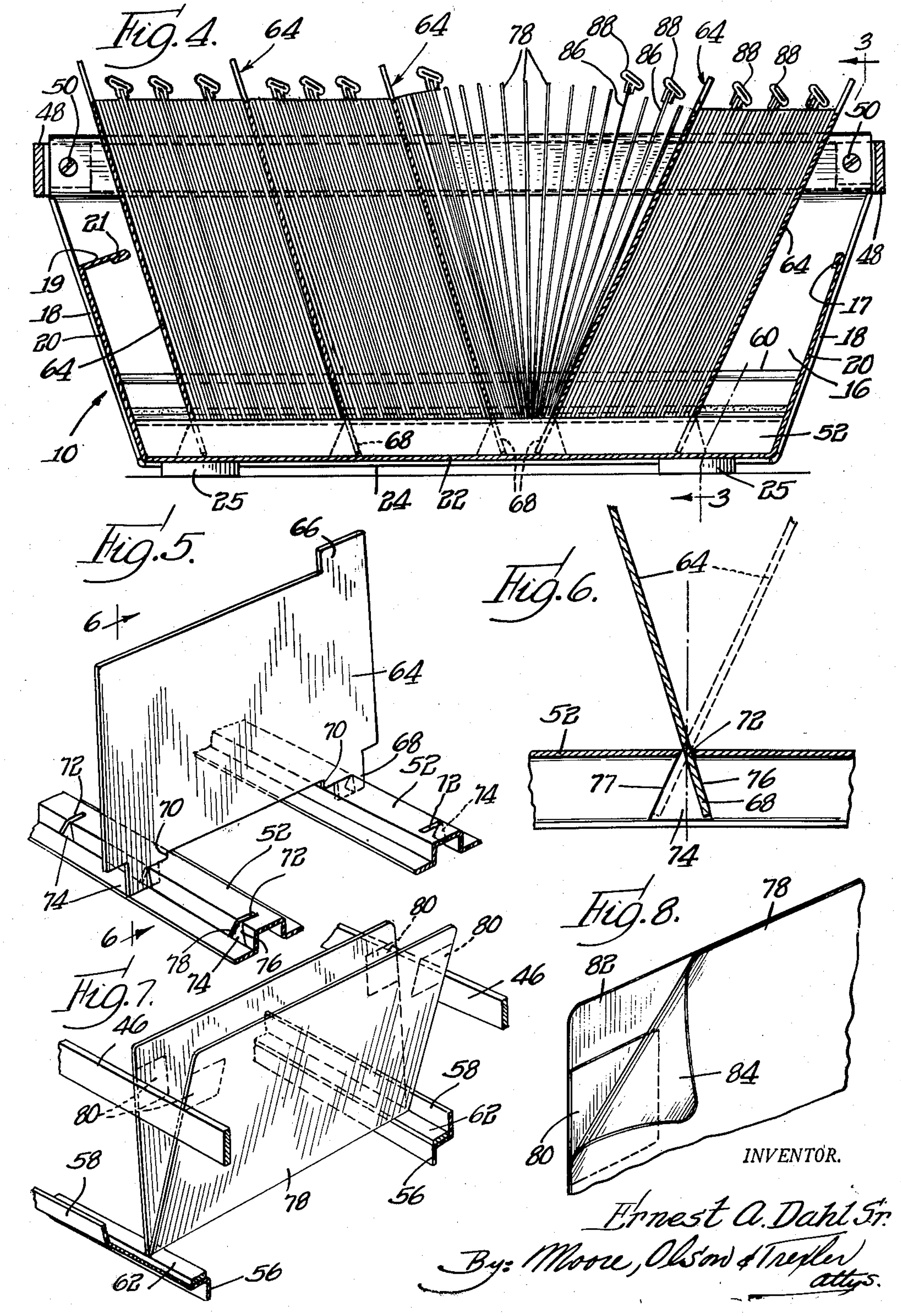
Fig. 4 is a longitudinal sectional view substantially along the line 4—4 of Fig. 3.
Fig. 5 is a perspective view showing the mounting of one of the separators.
Fig. 6 is a cross-sectional view through the separator and mount taken substantially along the line 6—6 of Fig. 5.
Fig. 7 is a perspective view showing the antifriction mounting of the cards.
Fig. 8 is a fragmentary perspective view showing the card insert of magnetically susceptible material.

Referring first to Figs. 1–4, there will be seen a file 10 embodying the principles of my invention. The file may be used simply as a desk file and placed upon a surface as shown in Figs. 1, 3, and 4, or several similar files can be placed in adjacent compartments 12 defined by a plurality of horizontal and vertical walls and partitions 14 (Fig. 2).

The file 10 as seen best in Figs. 1, 3, and 4 is rectangular in cross section and trapezoidal in longitudinal section, having side walls 16 provided with end flanges 18 to which end walls 20 are secured by means such as welding. The front end wall is folded down upon itself at 17 and welded to provide a smooth, stiff edge, and the back end wall extends inwardly at 19 and is folded over at 21 and welded. The end walls are integral with a floor 22 lying on top of longitudinal edge flanges 24 on the side walls 16 and welded or otherwise suitably secured thereto. Feet 25 of felt or other suitable material are secured by an adhesive or otherwise to the bottom of the floor 22.

The top longitudinal edges of the side walls 16 are outwardly and downwardly bent to form flanges 26 and 28. The flanges clamp beneath them horizontal and vertical flanges 30 and 32 of handle or spacer members 34 extending from end to end of file 10. The handle or spacer members 34 curve smoothly outwardly and downwardly from the flanges 32 as at 36 to join horizontal flanges 38 extending inwardly to vertical flanges 40 positioned beneath the vertical flanges 28. Short horizontal flanges 42 extend inwardly to contact the walls 16 below the upper portions 44 thereof which are offset outwardly. Vertical edge flanges 45 extend downwardly from the flanges 42 and are welded or otherwise suitably secured to the walls 16.

The upper flanges 28 and 30 and lower flanges 40 and 42 coact with the opposite side wall portions 44 to form channels within which are housed bar magnets 46. The bar magnets 46 are of Alnico or other magnetic material of high permanence and are magnetized with their poles along the edges rather than at the ends. The remainder of the file 10 is of non-magnetic material such as aluminum or aluminum alloy, although it its contemplated that brass, plastic, or other non-magnetic materials could be used. The handle or spacer members 34 provide large air spaces along the sides of the bar magnets 46 and prevent files from being positioned close enough to one another to cause interaction between magnetic fields.

Substantially U-shaped handles 48 of aluminum strap or other non-magnetic material fit into the ends of the channels in proximity to the magnets 46 and are held in place by means such as screws 50 passing through the wall portions 44 and threaded into the straps. The straps or handles act to position the bar magnets 46 and further act as handles for carrying the file or for withdrawing files from compartments such as the compartments 12 illustrated in Fig. 2.

A pair of longitudinally extending channels 52 is secured to the floor 22 by means such as spot welding the channel flanges 54 to the floor. The channels are spaced from one another and are located near the side walls 16. Longitudinally extending card support members 56 may be formed integral with the channels 52 or may be separate therefrom. The card support members 56 are essentially angle members with upwardly extending flanges 58 which are welded or otherwise suitably secured to the side walls 16 beneath horizontally extending detents or struck out portions 60 extending substantially from end to end of the file. Engagement strips or treads 62 which preferably are formed of sponge rubber are secured along the tops of the card support members 56 by means of a suitable adhesive.

Spacers 64 of non-magnetic sheet material, preferably aluminum, are mounted along the channels 52 in spaced relation. The spacers 64 are provided with upstanding tabs 66 at corresponding corners thereof to facilitate pivoting adjacent spacers relatively away from one another to allow the file cards therebetween to fan out magnetically so that their contents can be read at a glance. Each separator 64 further is provided with a pair of spaced apart lower tabs 68. The lower tabs 68 are spaced inwardly from the edges of the separators a sufficient distance to fit between the card support members 56 and extend inwardly therefrom substantially to the centers of the channels 52, fitting in appropriate slots in the channels as will be brought out shortly. The inner edges of the tabs 68 are provided with narrow shoulder portions 70 adapted to rest on top of the channels 52 and thereby pivotally to support the spacers 64.

To accommodate the lower tabs 68 the top walls of the channels 52 are provided with slots 72 (Figs. 5 and 6) extending half way across their lateral dimensions. The outer side walls of the channels 52 are provided with diverging slots 74 communicating with the slots 72. The diverging slots 74 are formed with their front edges 76 more nearly perpendicular to the top walls of the channels 52 than are the rear edges 77, and the edges of the slots 72 are angled so as to be rectilinear continuations of these edges. This angulation allows the spacers 64 to be tipped forward a greater distance than their normal rearward tipped positions and greatly facilitates fanning out of the cards to a position where they can be read with great facility.

The cards 78 are of rectangular configuration and rest at their lower corners on the rubber treads 62 of the card support members 56. The cards are spaced inwardly from the side walls 16 a short distance by the detents 60 and flanges 58 so that there is no friction between the cards and side walls.

The cards 78 generally resemble conventional file cards and are of substantially the same thickness. The significant difference resides in sheet metal inserts 80 mounted between laminations 82 and 84 (Fig. 8) of the card and near the upper, opposite corners thereof. The inserts 80 preferably are of mild steel as this material meets requirements of magnetic susceptibility with low magnetic retentivity while being sufficiently flexible to pass around a typewriter platen without rupturing the card laminations, and yet is strong enough for individual handling without damage prior to assembly with the card. The inserts 80 are positioned for close juxtaposition to the magnets 46 as readily may be seen in Figs. 3 and 7 so that magnetic poles may be induced in the inserts by the magnets 46.

Conventional separator cards 86 of fiberboard or the like (Fig. 4) provided with upstanding structure 88 for receiving indicia such as letters of the alphabet are spaced through the file for separating the cards into groups.

When it is desired to select a card from the file, all that is necessary is to flip one of the separators 64 forward from its normal rearward position and to flip forward the conventional separator card 86 of the desired group of cards. Each magnet 80, being magnetized with poles along the longitudinal edges, induces similar poles along the upper edges of all of the inserts of corresponding edges of the cards, and induces poles similar to one another along the bottom edges of the inserts. The adjacent similar or like poles induced in corresponding inserts of adjacent cards exert mutual repulsive forces on one another and cause the cards to fan out as shown near the middle of Figs. 1 and 4. The angularity with which the front and rear edges of the diverging slots 74 are cut in the side walls of the channels 52 sets the space in which the cards can fan out in such manner as to aid the cards in fanning out and to maintain them in readily readable positions. The angle is such that the cards approach vertically upright position when in their normal position so that they fall forward better and fan open better as the separator is moved a substantial distance from the vertical. The detents 60 in the side wall 16 and the flanges 58 engage the cards only near the lower corners so as to engender very little frictional resistance to their fanning out. These parts in spacing the upper parts of the cards away from the side walls prevent the cards from being placed in off center position such that one magnet would exert a greater attractive force on the inserts than would the other with the result that a card would be pulled against the side wall where it could not move readily.

The bar magnets used require very little space and the air spaces extending outwardly therefrom as defined by the handles or spacers 34 provide magnetic isolation. That is, two files cannot be placed sufficiently close together to cause magnetic interaction, and a file cannot be placed with either of its magnets sufficiently close to steel supporting structure to have deleterious effects on the magnet.

This application is a continuation-in-part of my application for Rotary File, Serial No. 230,186, filed June 6, 1951, now abandoned.

The particular example of my invention shown and described will be understood as being for illustrative purposes only. The invention will be understood as including all that which falls fairly within the spirit and scope of the appended claims.

I claim:

1. A magnetic card file comprising a box-like container of non-magnetic sheet material, a plurality of juxaposed cards having magnetic portions supported in said container, said magnetic portions being of limited height relative to the height of said cards, a pair of flat bar magnets oppositely polarized along their longitudinal edges and of substantially the same height as said magnetic portions, non-magnetic means for supporting said bar magnets in parallel relation on opposite sides of said structure for positioning of the magnetic portions of said cards adjacent said magnets, and hollow handles of said non-magnetic sheet material extending longitudinally of said magnets and outwardly a substantial distance therefrom away from said magnets magnetically to isolate said magnets.

2. A magnetic card file comprising a non-magnetic container having sheet material sides and adapted to support a plurality of juxtaposed cards having magnetic portions of limited height relative to the height of the cards, a pair of flat bar magnets having polarized edges, brackets of non-magnetic sheet material on said sheet material sides for supporting said bar magnets on opposite sides of said container, and hollow handles of said non-magnetic sheet material extending outwardly from said brackets and extending transversely outwardly away from and longitudinally of said magnets for magnetically isolating said magnets.

3. A magnetic card file comprising a box-like container having side walls of non-magnetic sheet material and adapted to support a plurality of juxtaposed cards having magnetic portions, a plurality of such cards in said container, a pair of flat bar magnets polarized along their longitudinal edges, brackets of said sheet material on said side walls for supporting said magnets on opposite sides of said container for positioning of the magnetic portions of said cards adjacent said magnets, hollow handles of said sheet material extending outwardly from said brackets and from said magnets and longitudinally of said magnets for magnetically isolating said magnets along the sides, a pair of U-shaped non-magnetic straps extending from the ends of said brackets and across the ends of said container to serve as handles and magnetically to isolate the ends of said magnets, means in said container adapted to engage said cards only adjacent the lower corners thereof to space said cards from said side walls for reducing frictional resistance to movement of said cards, a plurality of non-magnetic plate-like separators tiltably mounted in said container, means spacing said separators from said side walls, means for limiting forward tilting of said separators to a predetermined angle with the vertical, and means for limiting rearward tilting of said separators to an angle closer to the vertical than said predetermined angle to facilitate falling forward and magnetic fanning out of cards in said container.

References Cited in the file of this patent

UNITED STATES PATENTS

| | | |
|---|---|---|
| 859,272 | Weisner | July 9, 1907 |
| 1,721,240 | West | July 16, 1929 |
| 1,966,742 | Steinberg | July 7, 1934 |
| 2,494,528 | Winskowicz | Jan. 10, 1950 |
| 2,574,870 | Gunn | Nov. 13, 1951 |
| 2,656,091 | Mathiesen | Oct. 20, 1953 |

FOREIGN PATENTS

| | | |
|---|---|---|
| 697,616 | Germany | 1940 |
| 127,144 | Australia | 1948 |

OTHER REFERENCES

Washington Post, page 5R, March 26, 1950, "Magnetism Saves Time Rippling Cards."